United States Patent [19]

Ide et al.

[11] Patent Number: 4,747,734
[45] Date of Patent: May 31, 1988

[54] PROFILING APPARATUS

[75] Inventors: Kensuke Ide; Hiroshi Yamaji, both of Hiroshima, Japan

[73] Assignee: Mitsubishi Jukogyo Kabushiki Kaisha, Tokyo, Japan

[21] Appl. No.: 801,067

[22] Filed: Nov. 22, 1985

[51] Int. Cl.$^4$ ............... B23Q 35/04; G05B 19/18
[52] U.S. Cl. ..................... 409/99; 318/578; 364/474
[58] Field of Search ............ 318/578; 364/474, 520; 409/79, 80, 84, 114, 116, 117, 109, 99

[56] References Cited

U.S. PATENT DOCUMENTS

| | | | |
|---|---|---|---|
| 4,266,172 | 5/1981 | Yamazaki | 364/474 |
| 4,356,552 | 10/1982 | Imazeki et al. | 364/474 |
| 4,370,722 | 1/1983 | Imazeki et al. | 364/474 |
| 4,456,962 | 6/1984 | Imazeki et al. | 318/578 |
| 4,467,432 | 8/1984 | Imazeki et al. | 318/578 |

FOREIGN PATENT DOCUMENTS

85/03023 7/1985 PCT Int'l Appl. ............ 409/84

Primary Examiner—Z. R. Bilinsky
Attorney, Agent, or Firm—Toren, McGeady & Associates

[57] ABSTRACT

An improved profiling apparatus performs a profiling operation after a profiling surface on a modelwork, and includes a vector arithmetic unit for calculating a projection component in an X-Y plane of the profiling surface in accordance with a signal from a tracer head, that is, a contact detector and a profiling direction arithmetic unit for calculating a profiling direction and a pick feeding direction on the basis of an output from the vector arithmetic unit. The profiling apparatus is effective with high accuracy in the profiling operation, less useless operation and short processing time, and is useful for a processing machine such as a diesinking machine and a machining center.

2 Claims, 3 Drawing Sheets

F I G. 4
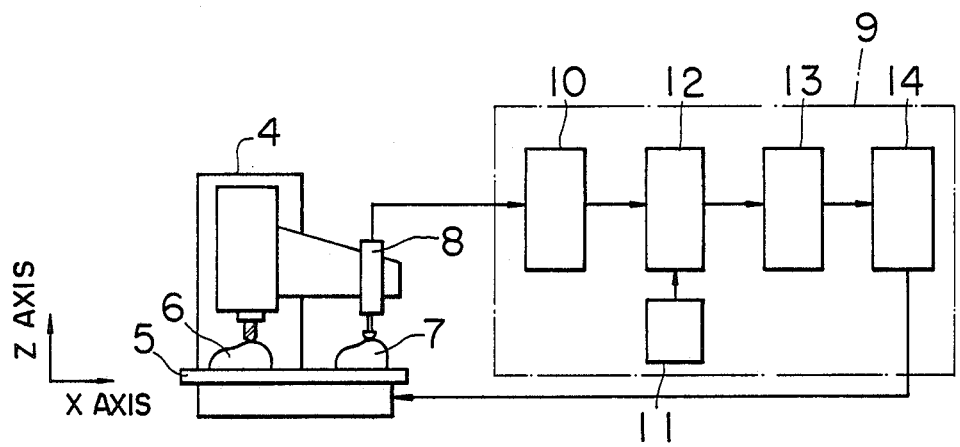
F I G. 5
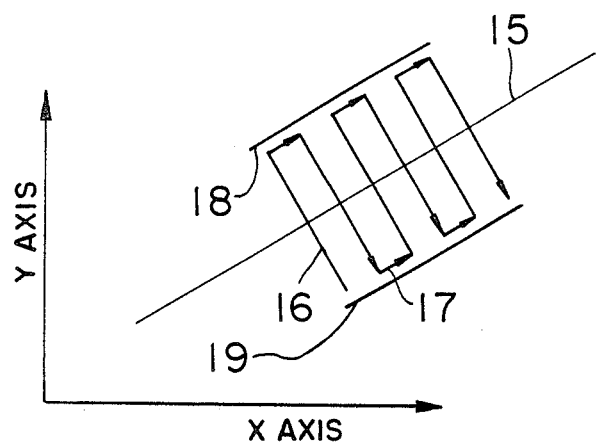

PROFILING APPARATUS

BACKGROUND OF THE INVENTION (i) Field of the Invention

The present invention relates to a profiling apparatus for use in a processing machine such as a diesinking machine and a machining center and which performs a profiling operation after a profiling surface on a modelwork.

(ii) Related Art Statement

Heretofore, profiling directions in the surface profiling of, for example, a diesinking machine are fixed to three direction. More particularly, when a plane of X-axis and Y-axis is considered as shown in FIG. 1(A), a direction 1 parallel with the X-axis or Y-axis and a direction 2 oblique by 45° to the X-axis and Y-axis are determined. Further, a direction 3 in a very small movement (named a pick feed) is parallel with the X-axis or Y-axis as shown in FIG. 1.

The diesinking machine including the profiling direction and the pick feeding direction as described above possesses drawbacks as follows:

(1) The profiling operation is complicated since the profiling direction must be divided into the direction X, the oblique direction of 45° and the direction Y in a corner portion as shown in FIG. 1(A) to perform the profiling operation.

(2) In order to avoid leaving a portion uncut, since it is necessary to overlap the three profiling directions at the same location, the processing time for cutting the same location is ineffective.

(3) The profiling direction is fixed to three directions including the X-axis and Y-axis direction and the oblique direction of 45° and the ascending and descending operation in the oblique direction along an oblique surface is effected to cut in the oblique direction of 45° as shown in FIG. 1(A). Accordingly, the processing accuracy is not good.

(4) Since the pick feed quantity is changed depending on the oblique angle in the profiling operation in the oblique direction along the oblique surface, the finishing is difficult.

FIG. 1(B) shows a section of a corner portion. The profiling operation of an apparatus which effects processing or working after a surface on a modelwork (hereinafter referred to as a profiling apparatus) is attained by scanning a predetermined specific area (hereinafter referred to as a profiling area) on the modelwork with a contact detector named a tracer head.

SUMMARY OF THE INVENTION

The present invention has been made in view of the above drawbacks.

(I) An object of the present invention is to provide a profiling apparatus which has simple operation, improved processing accuracy, no ineffective operation in overlap processing and short processing time.

(II) Another object of the present invention is to provide a profiling apparatus which can define any profiling direction and perform the pick feeding operation in the direction perpendicular to the profiling direction.

In order to achieve the above objects, the profiling apparatus of the present invention is constructed as follows:

(I) The profiling apparatus of the present invention is characterized by the provision of vector arithmetic means for calculating a projection component in an X-Y plane of a profiling surface in accordance with a signal of a tracer head and profiling direction arithmetic means for calculating a profiling direction and a pick feeding direction on the basis of an output of the vector arithmetic means.

(II) The profiling apparatus of the present invention is characterized by the provision of a vector arithmetic means for calculating a component of an X-Y plane which is a horizontal plane in accordance with a signal of the tracer head profiling a three-dimensional curved surface, means for setting a profiling direction, and means for calculating a profiling direction and a pick feeding direction in response to output signals of the vector arithmetic means and the profiling direction setting means, whereby the pick feeding operation is made in a direction perpendicular to any given profiling direction.

The profiling apparatus of the present invention constructed above has effects as follows:

(I) According to the present invention, since the profiling operation in the normal direction of the surface on the model is incorporated, the profiling operation is simple, profiling accuracy is high, uselessness in overlapping processing can be eliminated and processing time can be shortened. The profiling apparatus of this type can be applied not only to a diesinking machine but also a scanning machine and a three-dimensional measuring device.

(II) According to the present invention, since the profiling direction is determined to meet a shape of a model to be profiled, the processing accuracy is good. Further, since a distance between tool paths is equal to a given pick feed quantity and the pick feeding direction is parallel to the oblique surface, any useless operation can be eliminated and processing time can be shortened.

BRIEF DESCRIPTION OF THE DRAWINGS

FIGS. 2 and 3 show a first embodiment of the present invention, in which FIG. 2 shows a configuration thereof.

FIG. 4 is a block diagram showing a diesinking machine together with a control unit thereof according to a third embodiment of the present invention; and FIG. 5 illustrates a profiling operation of the machine of FIG. 4.

DETAILED DESCRIPTION OF THE PREFERRED EMBODIMENTS

The present invention will be now described in a greater detail hereunder with reference to the accompanying drawings which illustrate preferred embodiments thereof.

(First Embodiment)

Figure 2:
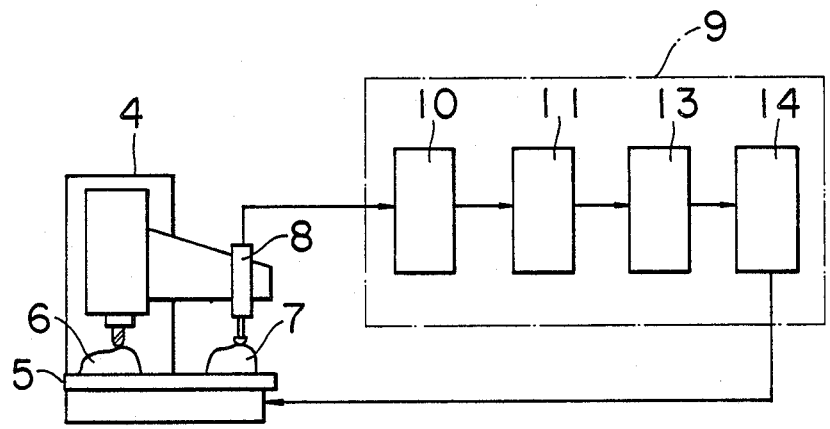

A first embodiment of the present invention is described with reference to FIGS. 2 and 3. In FIG. 2, an ordinary diesinking machine 4 includes a table 5 on which a workpiece 6 to be processed and a model 7 are mounted. A tracer head 8 is fixed on a tracer support to move up and down together with a tool so that the profiling operation is made after a pattern on the model 7. A profiling control unit 9 possesses an ordinary profiling function that the unit 9 is supplied with a signal of the tracer head 8 to produce an error signal thereof and controls the machine so that the error is minimized. In addition, the control unit 9 comprises a vector arithmetic unit 10 for calculating a projection component to an X-Y plane of a profiling surface in accordance with a signal from the tracer head 8, a profiling direction calculating unit 11 for determining the profiling direction and a pick feeding direction, a distribution circuit 13 for dividing the profiling direction into X-axis and Y-axis direction, and a servo amplifier 14 for amplifying signals in the X-axis and Y-axis direction to drive motors provided in feeding axes of the machine, respectively.

Figure 1A:
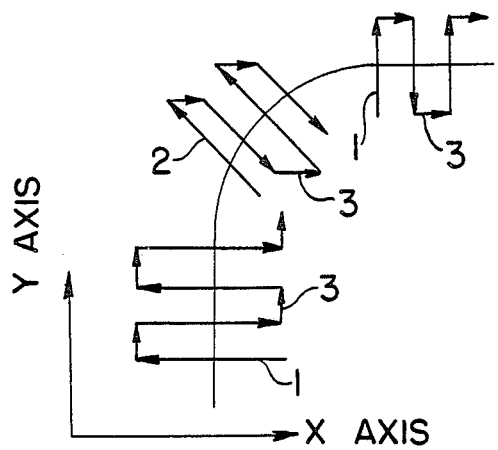
FIG. 1(A) illustrates a profiling locus in the prior art.
Figure 1B:
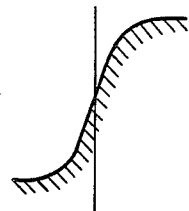
FIG. 1(B) is a sectional view of a shape to be profiled.
Figure 3A:
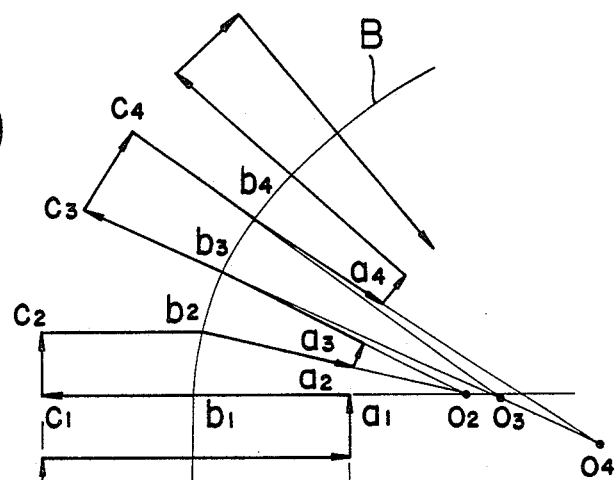
FIG. 3(A) illustrates a profiling locus and FIG. 3(B) is a sectional view showing a surface of a model.
Figure 3B:
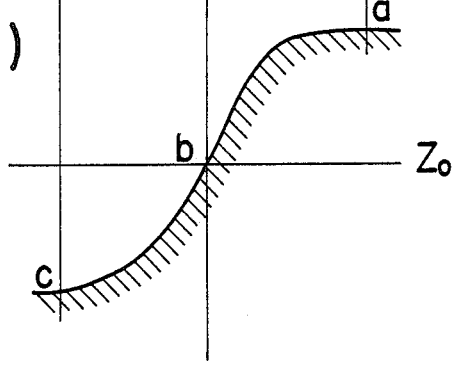

With such a structure shown in FIG. 2, the actual profiling operation is described with reference to FIGS. 3(A) and 3(B). Description is made to the model 7 having a section shown in FIG. 3(B), in which a locus on the X-Y plane by one point b (a point having a height Zo in the direction of axis Z in FIG. 3(B)) of the model 7 forms a shape as shown by a curve B of FIG. 3(A). The profiling operation by points a, b and c of FIG. 3(B) is described. The curve B composed of a line $a_1$, $b_1$ and $c_1$ is parallel with the Y-axis (see FIG. 1) and the ordinary profiling operation is performed. Accordingly, a pick feed $c_1$ to $c_2$ are made in parallel with the axis and the operation along a return line $c_2$ to $b_2$ is also made in parallel with the axis. The points $a_n$, $b_n$ and $c_n$ designate points on the X-Y plane. At the point $b_2$, a direction of a projection component on the X-Y plane of the normal line at the point $b_2$ is obtained from the signal of the tracer head 8 and the feeding operation is made by a distance of a straight line $b_2$ to $a_2$ (meaning a distance on the X-Y plane) in the obtained direction. The feeding quantity along the line $b_2$ to $a_2$ can be determined so that the maximum quantity thereof is defined by a position given by a potential line or a software potential line or a distance corresponding to the feeding quantity is equal to the distance $b_1$ to $a_1$ on the X-Y plane. Then, the intersecting point between an extension line of the line $b_1$ to $a_1$ and an extension line of the line $b_2$ to $a_2$ is defined to $0_2$. A straight line $b_3$ to $0_2$ is determined so that a partly circular arc $b_2$ to $b_3$ of a circle having a radius of the distance $b_2$ to $0_2$=distance $b_3$ to $0_2$ is a given pick feed quantity (which is equal to the quantity $c_1$ to $c_2$ in the case of parallel line to the axis). Then, a point $a_3$ is obtained so that a distance $0_2$ to $a_2$ is equal to a distance $0_2$ to $a_3$ on the line $b_3$ to $0_2$ and the pick feed along the line $a_2$ to $a_3$ is made. The profiling operation is then returned along the line $a_3$ to $b_3$. A normal line at the point $b_3$ is obtained and the operation proceeds to a point $c_3$ on the projection component of the X-Y plane. An intersecting point $0_3$ between extension lines of the straight lines $b_2$ to $a_2$ and $b_3$ to $c_3$ is defined and a straight line $b_4$ to $0_3$ is determined so that a partly circular arc $b_3$ to $b_4$ of a circle having a radius of the distance $b_3$ to $0_3$=distance $b_4$ to $0_3$ is equal to the arc $b_2$ to $b_3$. A point $c_4$ on an extension line of the straight line $b_4$ to $0_3$ is obtained to make the pick feed of a distance $c_3$ to $c_4$ and the operation is returned along line $c_4$ to $b_4$. The above same operation is repeatedly made to perform the profiling operation in the direction of following the shape of the model.

As apparent from the foregoing, in the case of performing the profiling operation between the points a and b in FIG. 3(B), that is, in the case of returning at the point b, the profiling operation can be made in the same manner as described above by attaining the pick feed at the point b along the curve B.

In FIG. 3(B), when the height of the whole positions a, b and c is changed, the profiling operaton can be made in the same manner as above by changing the height of the position b so that differences in the direction of Z-axis between the points a and b are constant without fixing the height Zo.

While the profiling operation in the reciprocation has been described with reference to FIG. 3, the profiling operation in one way can be attained.

(Second Embodiment)

A second embodiment of the present invention is now described in detail in conjunction with the drawings. In FIGS. 4 and 5, numeral 4 denotes an ordinary diesinking machine which includes a table 5 on which a workpiece 6 to be processed and a model 7 are disposed and a tracer head 8 which is fixedly mounted on a tracer support to move up and down together with a tool. A profiling control unit 9 possesses an ordinary profiling function that the unit 9 is supplied with a signal of the tracer head 8 to produce an error signal thereof and controls the machine so that the error is minimized. In addition, the contol unit 9 comprises a vector arithmetic unit 10 for calculating a component on an X-Y plane of a profiling direction in accordance with a signal from the tracer head 8, a profiling direction setting unit 11 for setting the profiling direction, a profiling direction arithmetic unit 12 for determining a profiling direction 16 and a pick feeding direction 17 on the basis of output signals of the vector arithmetic unit 10 and the profiling direction setting unit 11, a distribution circuit 13 for dividing an output signal of the profiling direction arithmetic unit 12 into components in the X-axis and Y-axis directions, and a servo amplifier 14 for amplifying signals for respective X-axis and Y-axis to drive motors provided on feeding shafts of the machine, respectively.

In the profiling operation by the profiling machine 4 performed along a shape 15 having a certain angle with regard to the feeding shaft as shown in FIG. 5, when the profiling direction 16 is set by the unit 11 so that the profiling direction 16 is perpendicular to the shape 15, the profiling direction arithmetic unit 12 produces a signal for moving in the set direction. When the machine is moved in the set direction and reaches a stroke limit 18, the profiling direction arithmetic unit 12 produces a signal for moving in the direction perpendicular to the profiling direction. The profiling stroke limit 18 is given by the potential line or the software potential line. When moved by the pick feed quantity in the direction perpendicular to the profiling direction, the profiling operation is made in the opposite direction. When reaching the profiling stroke limit 19, the pick feeding operation is effected in the direction perpendicular to the profiling direction 16 in the same manner as above. The above operation is repeatedly made in the same manner.

While FIG. 5 illustrates the profiling operation in reciprocation, the operation in one way can be made in the same manner.

While the typical preferred embodiments of the present invention has been described fully hereinbefore, it is to be understood that the present invention is not intended to be restricted to the details of the specific constructions shown in the preferred embodiments, but to contrary, many changes and modifications may be made in the foregoing teachings without any restriction thereto and without departing from the spirit and scope of the invention.

I claim:

1. A profiling apparatus for machining purposes by tracing a profiling surface on a model by means of a tracer head and driving electric motors provided on X-Y feed shafts of a machine tool which comprises:
   (a) a first arithmetic means for calculating a vector component of said profiling surface projected on an X-Y plane in accordance with a signal from said tracer head,
   (b) a second arithmetic means for calculating, on the basis of an output signal from said first arithmetic means, a profiling direction, a circumferential direction, as a pick feed direction, of a circle of curvature formed of a curve projected on the X-Y plane thus profiled and such a pick-feed quantity so as to assume a given pick-feed quantity on said curve,
   (c) means for distributing an output from said second arithmetic means in components of directions of said X-Y shafts, and
   (d) means for amplifying an output of each of direction components of said X-Y shafts so as to drive each of said electric motors.

2. A profiling apparatus for machining purposes by tracing a profiling surface on a model by means of a tracer head and driving electric motors provided on X-Y feed shafts of a machine tool, which comprises:
   (a) a first arithmetic means for calculating a vector component of said profiling surface projected on an X-Y plane in accordance with a signal from said tracer head,
   (b) means for setting a profiling direction,
   (c) profiling stroke limits established at both ends of a required range of said profiling direction,
   (d) a second arithmetic means for calculating a pick feed direction and a profiling direction in such a manner that when said machine tool moved in said profiling direction is allowed to reach said profiling stroke limit, a pick-feed quantity given in the direction perpendicular to said profiling direction can be moved and after pick-feeding, said machine tool can be moved in a profiling direction opposite to said previous profiling direction,
   (e) means for distributing an output signal from said second arithmetic means into direction components of said X-Y shafts, and
   (f) means for amplifying an output of each of direction components of said X-Y shafts so as to drive each of said electric motors.

* * * * *